(12) United States Patent
Kim et al.

(10) Patent No.: US 10,772,041 B2
(45) Date of Patent: Sep. 8, 2020

(54) BEACON SIGNAL PROCESSING SYSTEM

(71) Applicant: FCI Inc., Seongnam-si, Gyeonggi-do (KR)

(72) Inventors: Won Man Kim, Seongnam-si (KR); Chang Hwan Park, Seongnam-si (KR)

(73) Assignee: Dialog Semiconductor Korea Inc., Seoul (KR)

(*) Notice: Subject to any disclaimer, the term of this patent is extended or adjusted under 35 U.S.C. 154(b) by 0 days.

(21) Appl. No.: 16/237,998

(22) Filed: Jan. 2, 2019

(65) Prior Publication Data
US 2019/0208469 A1 Jul. 4, 2019

(51) Int. Cl.
*H04W 52/02* (2009.01)

(52) U.S. Cl.
CPC ... *H04W 52/0229* (2013.01); *H04W 52/0216* (2013.01); *H04W 52/0264* (2013.01); *H04W 52/0274* (2013.01)

(58) Field of Classification Search
CPC ......... H04W 52/0229; H04W 52/0216; H04W 52/0274; H04W 52/0264; H04W 52/0212; Y02D 70/142
See application file for complete search history.

(56) References Cited

U.S. PATENT DOCUMENTS

| 2008/0129880 A1* | 6/2008 | Shao ................. H04W 28/06 348/723 |
| 2008/0170551 A1* | 7/2008 | Zaks ................. H04W 52/0229 370/338 |
| 2014/0119252 A1 | 5/2014 | Kella et al. |
| 2014/0219147 A1* | 8/2014 | Yenganti ............ H04W 52/0206 370/311 |
| 2015/0351032 A1* | 12/2015 | Homchaudhuri ............................ H04W 52/0235 370/311 |

* cited by examiner

*Primary Examiner* — Mohamed A Kamara
(74) *Attorney, Agent, or Firm* — Saile Ackerman LLC; Stephen B. Ackerman

(57) ABSTRACT

A beacon signal minimization method and a beacon signal processing system utilizing a changed beacon element periodically receives a beacon signal from an access point and maintains network connectivity in a sleep mode, or only wakes up modules of hardware and software necessary for communication, by comparing whether an information element contained in the beacon signal is different from information stored in advance.

9 Claims, 6 Drawing Sheets

BEACON SIGNAL PROCESSING SYSTEM

RELATED APPLICATIONS

This application claims priority benefit of Korean Patent Application No. 10-2018-0000156 filed Jan. 2, 2018, of which is hereby incorporated by reference in its entirety.

BACKGROUND OF INVENTION

1. Field of Invention

The present invention relates to a beacon signal minimization method and processing system utilizing a frequently changed beacon element.

2. Related Art

Generally, when there is no data to be received, a power management module of a 802.11 wireless local area network (WLAN), in an active mode, enters a sleep mode.

In the sleep mode, the power management module checks data contained in periodically transmitted beacon frames, as a traffic indication message (TIM) or a delivery traffic indication message (DTIM), to determine whether there is data to be received. If a checking result indicates that there is data to be received, the power management module changes the sleep mode to an active mode transmitting power save-poll (PS-Poll) and receiving data. If the check result indicates that there is no data to be received, the sleep mode remains same.

Generally, to reduce and minimize power consumption, the power management module attempts to enter the sleep mode in the 802.11 WLAN. Normally, in order to enter in the active mode from the sleep (doze) mode, power consumption in each stage of the power management module in the 802.11 WLAN is produced by performing a main application program.

The power management module of the 802.11 WLAN is generally carried in a main application program for services of all functions. Specifically, the main application program contains data and codes not only necessary for a check of the TIM/DTIM but also for associated services. Furthermore, the main application program needs to initiate the associated services, thereby increasing unnecessary initiation time, and hardware modules working in conjunction with the associated services are thus in a power-on state producing unnecessary power consumption.

SUMMARY OF INVENTION

An object of the present invention is to provide a beacon signal minimization method and a beacon signal processing system utilizing a changed beacon element. The beacon signal processing system periodically receives a beacon signal from an access point and maintains network connectivity in a sleep mode, or only wakes up modules of hardware and software necessary for communication, by comparing whether an information element contained in the beacon signal is different from information stored in advance.

To achieve the above-mentioned object, the beacon signal processing system comprises a memory and a processor, wherein a beacon receiver program containing computerized instructions is stored in the memory and configured to be executed by the processor to perform a method, the method comprising: periodically receiving, by a beacon receiver, a beacon signal from an access point; identifying an information element of data contained in the beacon signal; generating a result value of performing a checksum on the information element, and identifying whether the information element is changed according to the result value; and operating in a sleep mode according to whether or not the information element is changed.

The present invention further provides a computer-readable recording medium, recording a program for performing a method, the method comprising: periodically receiving a beacon signal from an access point; identifying an information element of data contained in the beacon signal; generating a result value of performing a checksum on the information element, and identifying whether the information element is changed according to the result value; and operating in a sleep mode according to whether or not the information element is changed.

The present invention has advantages as follows: the beacon signal processing system, according to whether an information element contained in the beacon signal is different from information stored in advance, maintains a sleep mode or only wakes up part of modules of hardware and software necessary for communication in order to reduce power consumption of a station and workload of hardware and software for processing data.

DESCRIPTION OF PREFERRED EMBODIMENTS

Figure 1:
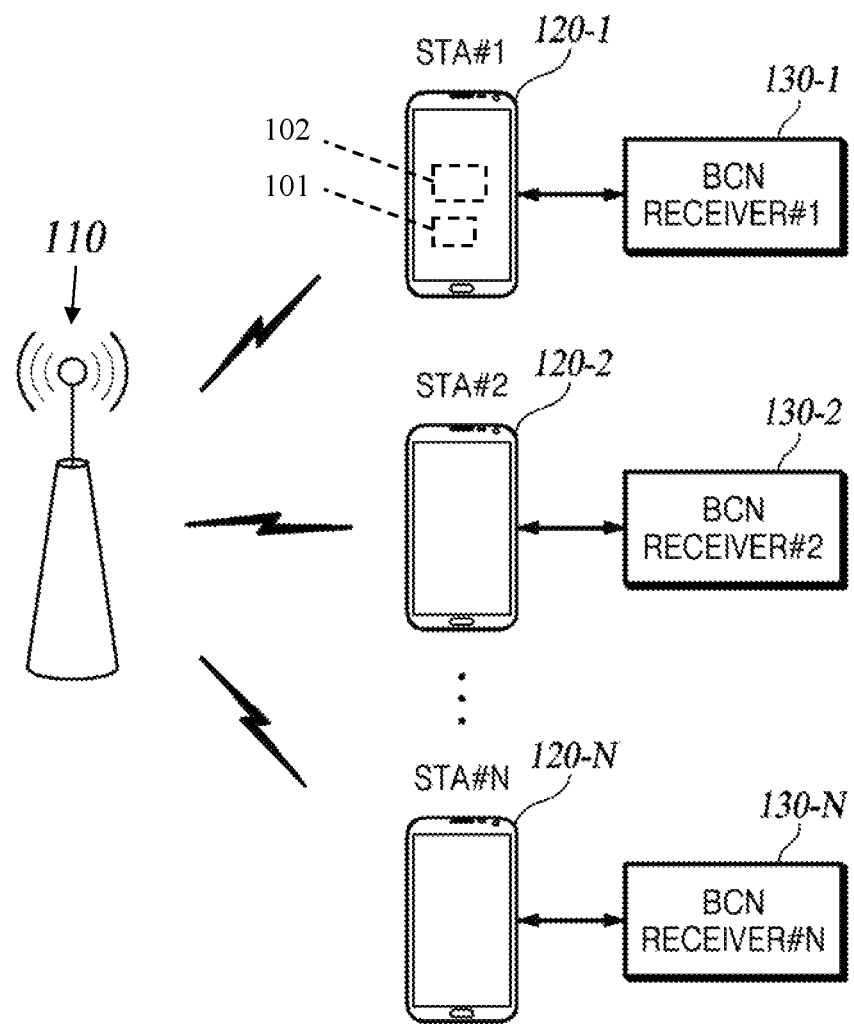
FIG. 1 is a schematic block diagram showing a beacon signal minimization processing system in accordance with an embodiment of the present invention.

FIG. 1 is a schematic block diagram showing a beacon signal minimization processing system in accordance with an embodiment of the present invention. The beacon signal minimization processing system in accordance with this embodiment includes an access point (AP) 110 and a station (STA) 120-1, a STA 120-2, and a STA 120-3, but not limited thereto.

The access point 110 periodically transmits a beacon signal (BCN) containing data to maintain network connectivity with the STA 120-1, 120-2, and 120-3 within a coverage range.

Wireless local area network (WLAN) network technology and a broadband network access can be widely deployed in a family. WLAN network technology is generally wireless fidelity (Wi-Fi). A WLAN device (usually refers to a station, or STA for short) connected with WLAN network is generally driven by a sleep mode reducing power consumption.

Generally, the STA 120-1, 120-2, 120-N in WLAN needs to be woken up to process a beacon signal after receiving the beacon signal from an access point. The STA 120-1, 120-2, 120-N in accordance with the embodiment of the present invention is awake only when the beacon signal received contains necessary data. The STA 120-1, 120-2, 120-N in a sleep mode identifies whether data contained in the beacon signal received from the access point 110 is necessary data, and is thus selectively being woken up.

The STA 120-1, 120-2, 120-N, operating in the sleep mode, is required to be changed to a wake-up state in order to communicate with the access point 110. The STA 120-1, 120-2, 120-N performs actions of communicating with the access point 10 and a frame, or receiving or channel scanning and the like when being changed from the sleep mode to the wake-up state.

The STA 120-1, 120-2, 120-N, when being in a state of not having communication with the access point 110, enters in the sleep mode to reduce power consumption to conserve power. The STA 120-1, 120-2, 120-N updates network information after receiving a beacon signal from the access point 110 so as to be capable of successfully communicating with the access point 110.

The beacon signal from the access point 110 is periodically transmitted, but is not regularly changed. Even being changed, the beacon signal still can be an information element (IE) necessary for a non-beacon system. A general beacon system is required to update network information upon receiving a beacon signal each time.

The STA 120-1, 120-2, 120-N is defined as an electronic device for communication with the access point 110. The STA 120-1, 120-2, 120-N includes a memory 101 stored with a program or protocol utilized to communicate with the access point 110, and a processor 102 utilized to execute corresponding programs to perform calculating and controlling (as shown in FIG. 1). The STA 120-1, 120-2, 120-N can be a smart phone, a tablet, a laptop, a personal computer (PC), a personal digital assistant (PDA), a gaining machine, a portable multimedia player, a wireless communication terminal, a TV, or a media player.

The STA 120-1, 120-2, 120-N includes (i) communication apparatus such as communication demodulator for communicating with various devices or wireless networks (ii) a memory for storing various programs and data (iii) a processor and the like for executing programs to perform calculating and controlling. In at least one embodiment, the memory can be a computer-readable recording/storage medium, such as a random access memory (RAM), a read only memory (ROM), a flash memory, an optical disk, a magnetic disk, or a solid state disk (SSD), and the like. In at least one embodiment, the processor may be programmed to selectively perform more than one of the actions and functions described in the specification. In at least one embodiment, the processor is exemplified by hardware such as a whole or a specific partial structure of an application specific integrated circuit (ASIC).

The memory is stored with related data and programs. A processor retrieves and processes the related data from the memory. One processor is capable of performing various functions as described above, or multiple processors are utilized to perform the functions in such a way to share a workload. The processor can be exemplified by a general-purpose processor, but also can be exemplified by chips specifically designed for performing the functions.

A beacon receiver program 130 is stored in the memory of the station exemplified by the electronic device. Specifically, a beacon receiver program 130-1, 130-2, 130-N is stored in the memory 101 of the STA 120-1, 120-2, 120-N. The STA 120-1, 120-2, 120-N utilizes the processor 102 to execute the beacon receiver program 130-1, 130-2, 130-N to periodically receive the beacon signal from the access point 110 (as shown in FIG. 1), and determines whether to change the sleep mode to the wake-up state according to the beacon signal received.

The STA 120-1, 120-2, 120-N utilizes the beacon receiver program 130-1, 130-2, 130-N to identify whether data contained in the beacon signal periodically received from the access point 110 contains changed data. According to the changed data contained in the data of the beacon signal, the STA 120-1, 120-2, 120-N utilizes the beacon receiver program 130-1, 130-2, 130-N to change the sleep mode to the wake-up state.

The beacon receiver program 130-1, 130-2, 130-N executes a data change discrimination algorithm (e.g. CRC32) based on each information element. The beacon receiver program 130-1, 130-2, 130-N generates a result value of performing a checksum on each information element in response to the data change discrimination algorithm (e.g. CRC32).

For example, the beacon receiver program 130-1, 130-2, 130-N executes the data change discrimination algorithm (e.g. CRC32) based on each information element, and generates result data containing a preset byte unit (e.g. 4 bytes), with a result value of a checksum per each information element.

The beacon receiver program 130-1, 130-2, 130-N continuously generates the result data containing the preset byte unit in a predetermined wake-up period, and stores the result data in a storage place where data can be maintained after power-off.

Then, after being awoken in the predetermined wake-up period, the beacon receiver program 130-1, 130-2, 130-N compares the result data generated currently with the result data stored in advance and containing the preset byte unit (e.g. 4 bytes). When the result data generated currently and the result data stored in advance are identical, the STA 120-1, 120-2, 120-N operates in a sleep mode.

After the beacon receiver program 130-1, 130-2, 130-N is awoken in the predetermined wake-up period, when the result data generated currently and the result data stored in advance are not identical, the STA 120-1, 120-2, 120-N wakes up part or all of modules of hardware and software necessary for communication with the access point 110.

Data that is required to maintain operation after power-off is classified into two types: one is "necessary information element", and the other one is "a result value of performing a checksum based on each element information".

The 'necessary information element' refers to the information that selects a basis of the information element on which the checksum is to be performed. The 'result value of performing a checksum based on each element information' is a result value of performing a checksum based on each element information through the data change discrimination algorithm (e.g. CRC32), and means result data containing the preset byte unit (e.g. 4 bytes).

The STA 120-1, 120-2, and 120-N can identify whether the information element of data contained in the beacon signal is the necessary information element by using a positive filter and a negative filter.

The positive filter is a filter that filters only the necessary information element. The negative filter is a filter that removes unnecessary information for the information element of data contained in the beacon signal during filtering.

The negative filter is used because the number of unnecessary information elements can be set to 255 when necessary information elements are stored, but forming a space of 255 requires a lot of resources.

If the negative filter is used, it is capable of saving the resources by excluding the necessary information element from the information elements of the data contained in the beacon signal and importing the remaining information elements, thereby to save the resources.

If the number of necessary information elements is too small, among the information elements of the data contained in the beacon signal, all the remaining information elements are imported after removing unnecessary information elements, and the checksum is executed, thereby saving resources.

Figure 2:
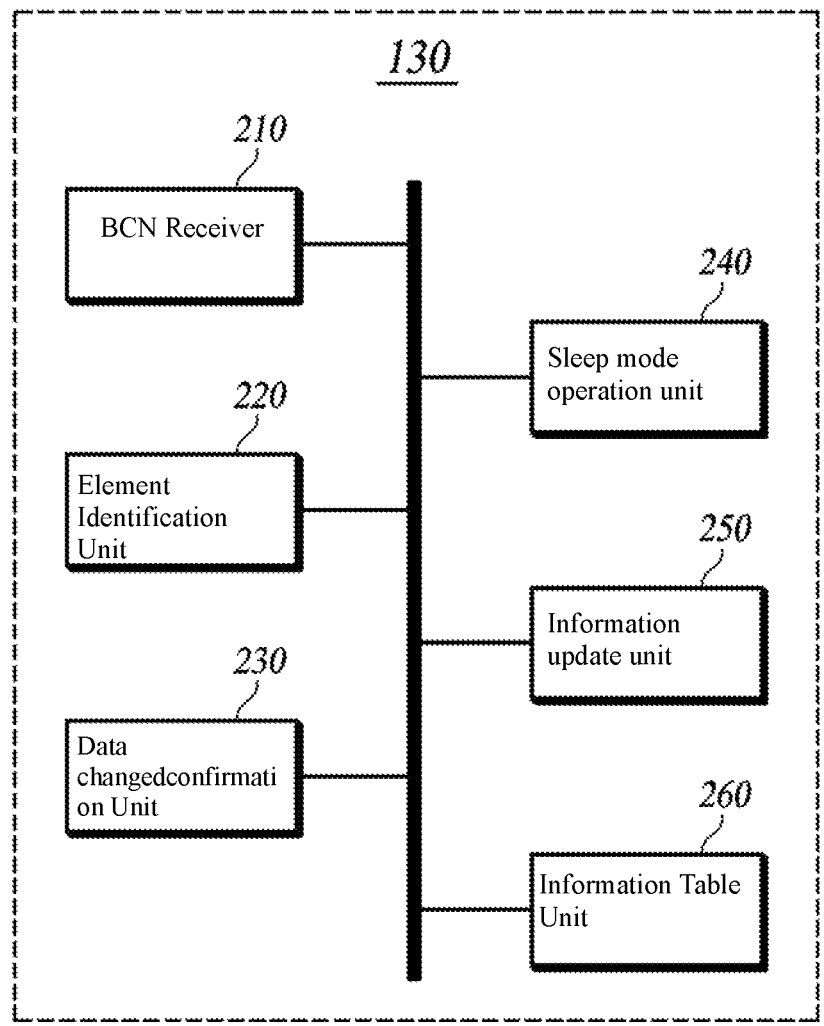
FIG. 2 is a schematic block diagram of a beacon receiver program of the present invention.

FIG. 2 is a schematic block diagram of a beacon receiver program of the present invention. The beacon receiver program 130-1, 130-2, 130-N in accordance with the embodiment of the present invention includes a beacon receiver 210, an element identification unit 220, a data changed confirmation unit 230, a sleep mode operation unit 240, an information update unit 250, and an information table unit 260. However, constituent elements contained in the beacon receiver program 130-1, 130-2, 130-N are not limited thereto.

The beacon receiver program 130-1, 130-2, 130-N can be implemented as a separate beacon signal minimization processing system including software modules as well as hardware modules.

Constituent elements included in the beacon receiver program 130-1, 130-2, 130-N are connected with communication paths of software modules or hardware modules in a connecting device, and are operated in connection with each other. The constituent elements utilize one or more communication buses or signal lines to communicate.

Each of the constitute elements of the beacon receiver program 130-1, 130-2, 130-N as shown in FIG. 2A is defined as a unit for processing at least a function or action, and can be exemplified by a software module, a hardware module, or a combination of the software and hardware modules.

The beacon receiver 210 periodically receives a beacon signal from the access point 110, wherein the beacon signal received from the access point 110 is defined as a current beacon signal.

The element identification unit 220 identifies the information element of data contained in the beacon signal. The element identification unit 220 compares an information element received from the information table unit 260 with the information element of the current beacon signal. The element identification unit 220 identifies whether the information element of the current beacon signal is the necessary information element.

The element identification unit 220 utilizes the positive filter and the negative filter to identify whether the information element of data contained in the current beacon signal is the necessary information element.

The data changed confirmation unit 230 generates a result value of performing a checksum on the information element of the current beacon signal received from the access point 110. The data changed confirmation unit 230 confirms whether the information element of the data contained in the current beacon signal is changed, based on the result value of the received current beacon signal.

When the data changed confirmation unit 230 confirms that the information element of the current beacon signal is the necessary information element, the data changed confirmation unit 230 performs the checksum on the information element identified as the necessary information element and generates the result value of the current beacon signal.

The data changed confirmation unit 230 checks whether there is data changed in the information element, based on the result value of the current beacon signal.

The data changed confirmation unit 230 performs the checksum on the information element identified as the necessary information element and generates the result value of the current beacon signal. The data changed confirmation unit 230 performs the checksum on the information element contained in a beacon signal which is received by the beacon receiver before the current beacon signal and is defined as a prior beacon signal, and generates a result value of the prior beacon signal.

The data changed confirmation unit 230 compares the result value of the current beacon signal with the result value of the prior beacon signal, and checks whether the information element contained in the current beacon signal contains changed data. The data changed confirmation unit 230 identifies whether the result value of the current beacon signal and the result value of the prior beacon signal are identical.

The sleep mode operation unit 240 operates in a sleep mode according to whether or not the information element of the data contained in the current beacon signal is changed.

When the information element of the data contained in the current beacon signal is identified as the unnecessary information element, the sleep mode operation unit 240 operates in the sleep mode by turning off part or all of modules of hardware and software necessary for communication with the access point 110.

When the result value of the current beacon signal and the result value of the prior beacon signal are identical, the sleep mode operation unit 240 determines that there is no data changed in the information element of the current beacon signal and operates in the sleep mode.

When the result value of the current beacon signal and the result value of the prior beacon signal are not identical, the information update unit 250 determines that changed data exists in the information element and operates in an active mode.

In order to operate in the active mode, the information update unit 250 changes part or all of modules of hardware and software necessary for communication with the access point 110 to a wake-up state and processes the changed data of the information element.

The information table unit 260 is configured to store the 'necessary information element' for communication with the access point 110, and the 'result value of performing a checksum based on each element information'.

The 'necessary information element' and the 'result value of performing a checksum based on each element information' are stored on a storage space where they can be maintained after power-off.

The 'necessary information element' refers to the information that selects a basis of the information element on which the checksum is to be performed. The 'result value of performing a checksum based on each element information' is a result value of performing a checksum based on each element information through the data change discrimination algorithm (e.g. CRC32), and means result data containing the preset byte unit (e.g. 4 bytes).

Figure 3:
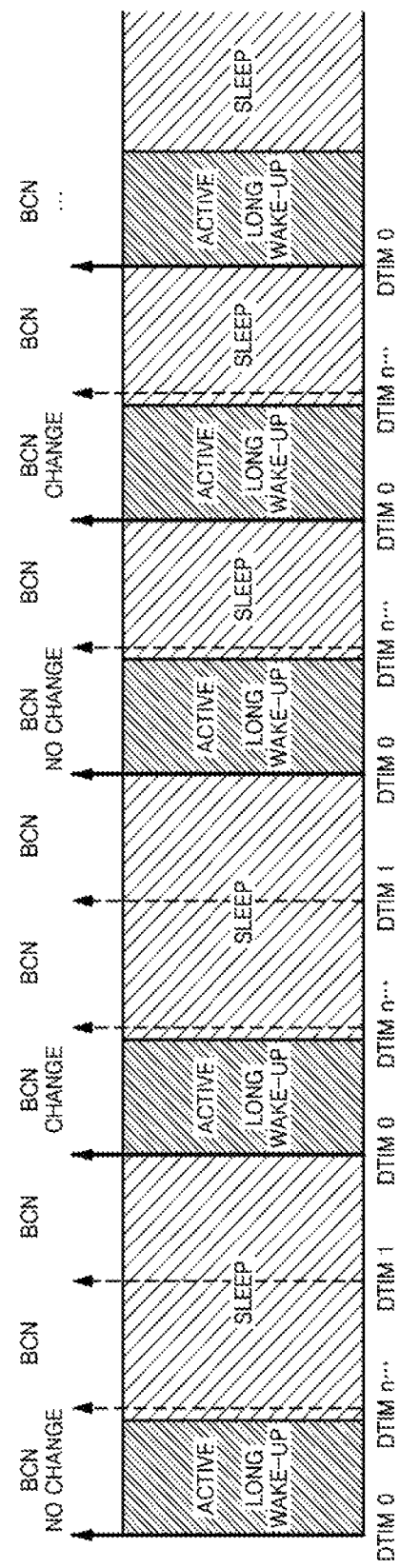
FIG. 3 is a diagram showing whether a wake-up period is periodically performed according to a beacon signal periodically transmitted.

FIG. 3 is a diagram showing whether a wake-up period is periodically performed according to a beacon signal periodically transmitted.

The beacon receiver program 130-1, 130-2, 130-N is not frequently awake. As shown in FIG. 3, they are woken up only for necessary in a predetermined wake-up period.

The STA 120-1, 120-2, 120-N periodically receives a beacon signal from the access point 110, and determines whether to enter a wake-up state from a sleep mode according to the beacon signal received.

The STA 120-1, 120-2, 120-N identifies whether there is changed data in the data contained in the beacon signal periodically received from the access point 110. The STA 120-1, 120-2, 120-N is changed from a sleep mode to a wake-up state according to whether the changed data exists in the data contained in the beacon signal.

Operation processes of the STA 120-1, 120-2, 120-N are described as follows when changed data exists in the data contained in the beacon signal.

To process the changed data in the beacon signal, the STA 120-1, 120-2, 120-N utilizes the beacon receiver program 130-1, 130-2, 130-N to change part or all of modules of hardware and software of the STA 120-1, 120-2, 120-N necessary for communication to the wake-up state.

The STA 120-1, 120-2, 120-N analyzes and interprets necessary information elements in the beacon signal necessary for beacon communication, and responds changed events during a beacon communication processing process.

The STA 120-1, 120-2, 120-N analyzes information elements of the beacon signal received from the access point 110, and selectively identifies whether changed data exists, and wakes up corresponding hardware and software when the information elements corresponds to a wake-up condition (active mode).

The access point 110 periodically transmits beacon signals to the STA 120-1, 120-2, 120-N within a coverage range.

In the event that the data contained in the beacon signal periodically transmitted from the access point 110 is frequently changed, the STA 120-1, 120-2, 120-N needs to process the data contained in the beacon signal frequently changed, thereby resulting in an additional workload for the STA 120-1, 120-2, 120-N.

Generally, even when an STA receives from the access point 110 a beacon signal containing data not unnecessary for communication with the access point 110 but is identified as changed data, the STA is still changed to a wake-up state to work even when the data received is not necessary information.

In the embodiment of the present invention, the STA 120-1, 120-2, 120-N utilizes the beacon receiver program 130-1, 130-2, 130-N to identify whether data contained in the beacon signal is changed and whether the information element is unnecessary information element, and therefore operates in the sleep mode.

As shown in FIG. 3, the access point 110 buffers data to be transmitted to the STA 120-1, 120-2, 120-N operating in the sleep mode, wherein the data is transmitted by a beacon signal. The access point 110 periodically transmits the beacon signal in order to transmit a frame being buffered to the STA 120-1, 120-2, 120-N operating in the sleep mode.

Information representing a buffered frame is included in a Traffic Indication Message (TIM) and transmitted to the STA 120-1, 120-2, and 120-N in the coverage by a beacon frame. The TIM is an information field transmitted by the AP 110 using a beacon frame in the wireless LAN standard 802.11.

The access point 110 transmits the beacon signal again to the surrounding STA 120-1, 120-2, 120-N. The STA 120-1, 120-2, 120-N operates in the sleep mode when there is no changed data contained in the data of the beacon signal received from the access point 110.

The access point 110 transmits the beacon signal again to the surrounding STA 120-1, 120-2, 120-N in a predetermined period. The STA 120-1, 120-2, 120-N maintains operation in the sleep mode when there is no changed data contained in the data of the beacon signal received from the access point 110.

The STA 120-1, 120-2, 120-N periodically enters the sleep mode from the wake-up state to receive a beacon signal from the access point 110. The STA 120-1, 120-2, 120-N analyzes the beacon signal to determine a period of receiving broadcast/multicast data.

The STA 120-1, 120-2, 120-N identifies a delivery traffic indication message (DTIM) of a beacon signal. The DTIM refers to parameters of transmission contained in a TIM. When the access point 110 specifies parameters contained in the DTIM, the STA 120-1, 120-2, 120-N operates by complying with the parameters contained in the DTIM.

Figure 4:
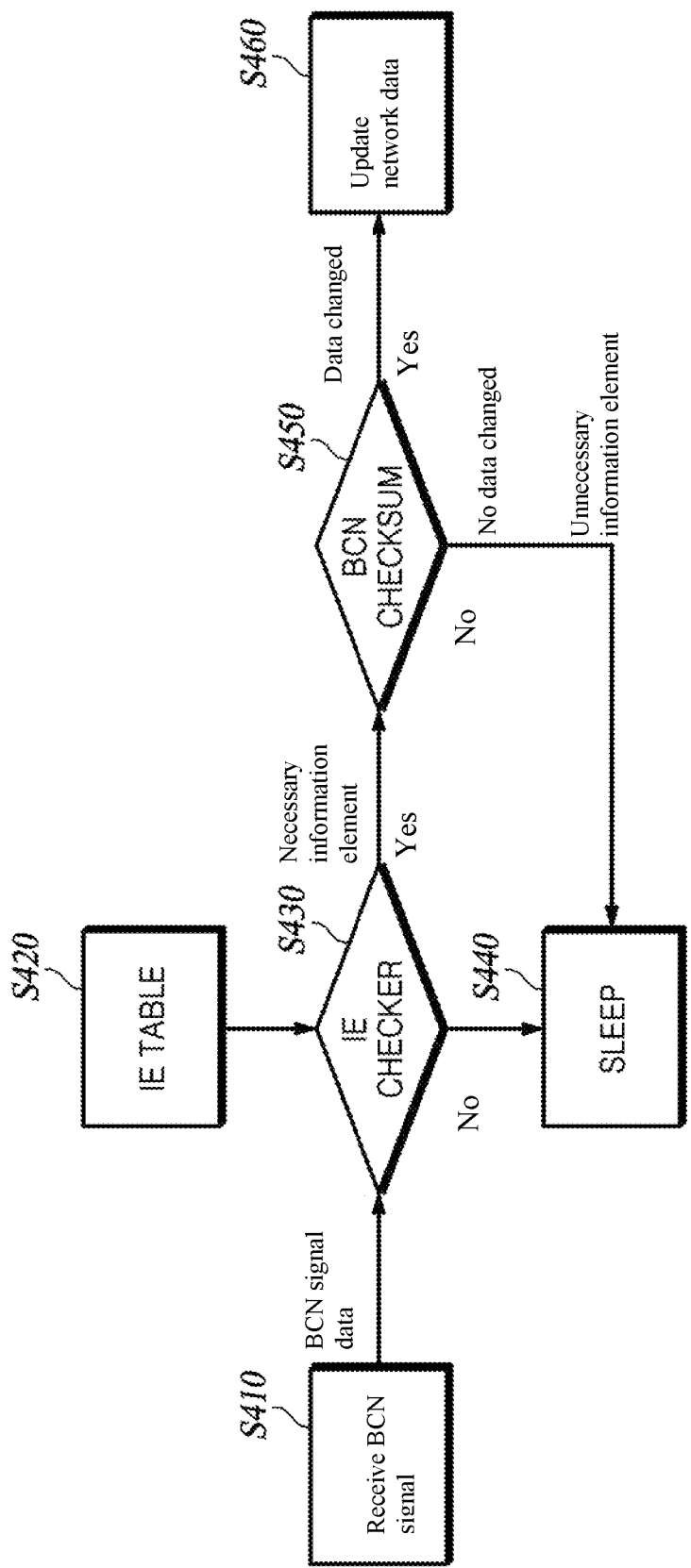
FIG. 4 is a flowchart showing a beacon signal minimization method utilizing a frequently changed beacon element in accordance with an embodiment of the present invention.

FIG. 4 is a flowchart showing a beacon signal minimization method utilizing a frequently changed beacon element in accordance with an embodiment of the present invention.

The STA 120-1, 120-2, 120-N utilizes the beacon receiver program 130-1, 130-2, 130-N to periodically receive a beacon signal from the access point 110 (S410).

The STA 120-1, 120-2, 120-N utilizes the beacon receiver program 130-1, 130-2, 130-N to identify an information element of data contained in the current beacon signal.

The STA 120-1, 120-2, 120-N utilizes the information table unit 260 to receive table information stored in advance for the beacon receiver program 130-1, 130-2, 130-N to identify whether the information element of data contained in the current beacon signal is the necessary information element (S420).

The STA 120-1, 120-2, 120-N utilizes the beacon receiver program 130-1, 130-2, 130-N to compare the information element of the data contained in the current beacon signal with the table information stored in advance in order to identify whether the information element of the current beacon signal is the necessary information element (S430).

According to an identification result in the step S430, when the information element of the data contained in the current beacon signal is identified as an unnecessary information element, the STA 120-1, 120-2, 120-N utilizes the beacon receiver program 130-1, 130-2, 130-N to operate in the sleep mode (S440).

According to an identification result in the step S430, when the information element of the data contained in the current beacon signal is a necessary information element, the STA 120-1, 120-2, 120-N utilizes the beacon receiver program 130-1, 130-2, 130-N to generate a result value of the current beacon signal for performing a checksum on an information element corresponding to the necessary information element.

The STA 120-1, 120-2, 120-N utilizes the information table unit 260 to receive a result value of a prior beacon signal for performing a checksum on the information element, in order for the beacon receiver program 130-1, 130-2, 130-N to identify whether an information element of data contained in the current beacon signal contains changed data.

The STA 120-1, 120-2, 120-N utilizes the beacon receiver program 130-1, 130-2, 130-N to generate a result value of the current beacon signal for performing a checksum on an information element identified as the necessary information element.

The STA 120-1, 120-2, 120-N utilizes the beacon receiver program 130-1, 130-2, 130-N, based on the result value of the current beacon signal and the result value of the prior beacon signal, to identify whether the information element of the data contained in the current beacon signal contains changed data (S450).

In the step S450, the STA 120-1, 120-2, 120-N utilizes the positive filter to identify whether the changed data exists in the information element of the data contained in the current beacon signal. The positive filter means a filter that filters only necessary information elements.

In the step S450, the STA 120-1, 120-2, 120-N utilizes the beacon receiver program 130-1, 130-2, 130-N to perform positive filtering on the result value of the current beacon signal and the result value of the prior beacon signal and remove only necessary information elements.

According to an identification result in the step S450, when there is no data changed in the result obtained by performing the positive filtering, the STA 120-1, 120-2, 120-N utilizes the beacon receiver program 130-1, 130-2, 130-N to operate in the sleep mode (S440).

In the step S440, when values obtained by performing the positive filtering on the result value of performing the checksum on the current beacon signal and on the prior beacon signal are the same, the STA 120-1, 120-2, 120-N confirms that the information element does not contain changed data.

According to an identification result in the step S450, when there is data changed in the result obtained by performing the positive filtering, the STA 120-1, 120-2, 120-N utilizes the beacon receiver program 130-1, 130-2, 130-N to update network information (S460).

In the step S460, the STA 120-1, 120-2, 120-N utilizes the beacon receiver program 130-1, 130-2, 130-N to change part or all of modules of hardware and software necessary for communication with the access point 110 to a wake-up state and process the changed data of the data contained in the beacon signal.

The steps S410 to S460 as shown in FIG. 4 are sequentially performed, but not limited thereto. That is, an order of performing the steps is variable or at least one or more than one of the steps are performed in parallel. Therefore, FIG. 4 is not to limited to a time sequence order.

As described above, the beacon signal minimization method using the frequently changed beacon element according to the first embodiment as shown in FIG. 4 can be implemented by a program and recorded on a non-transitory computer-readable recording medium. A program for implementing the beacon signal minimization method using the frequently changed beacon element according to the first embodiment is recorded in a non-transistory computer-readable recording medium including all kinds of records in which data that can be read by a computer system.

Figure 5:
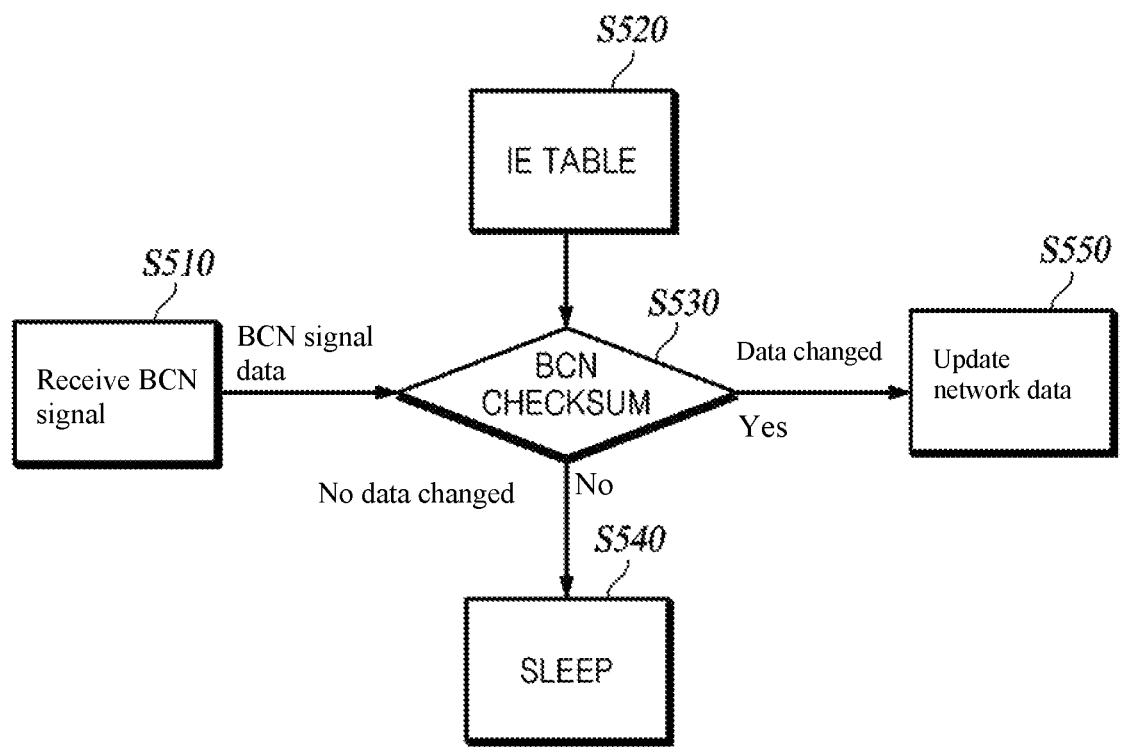
FIG. 5 is a flowchart showing the beacon signal minimization method utilizing a frequently changed beacon element in accordance with another embodiment of the present invention.

FIG. 5 is a flowchart showing the beacon signal minimization method utilizing a frequently changed beacon element in accordance with another embodiment of the present invention.

The STA 120-1, 120-2, 120-N utilizes the beacon receiver program 130-1, 130-2, 130-N to periodically receive a beacon signal from the access point 110 (S510).

The STA 120-1, 120-2, 120-N utilizes the beacon receiver program 130-1, 130-2, 130-N to identify an information element of data contained in the current beacon signal.

The STA 120-1, 120-2, 120-N utilizes the beacon receiver program 130-1, 130-2, 130-N to generate a result value of the current beacon signal for performing a checksum on all information elements of the data contained in the current beacon signal.

The STA 120-1, 120-2, 120-N utilizes the information table unit 260 to receive table information stored in advance for the beacon receiver program 130-1, 130-2, 130-N to identify whether the information element of the data contained in the current beacon signal is the necessary information element (S520).

In the step S520, the STA 120-1, 120-2, 120-N utilizes the information table unit 260 to receive the result value of the prior beacon signal for performing the checksum on the information element contained in the prior beacon signal.

The STA 120-1, 120-2, 120-N utilizes the beacon receiver program 130-1, 130-2, 130-N, based on the result value of the current beacon signal and the result value of the prior beacon signal, to identify whether the information element of the data contained in the current beacon signal contains changed data (S530).

In the step S530, the STA 120-1, 120-2, 120-N utilizes the negative filter to identify whether the changed data exists in the information element of the data contained in the current beacon signal. The negative filter means a filter that filters out unnecessary information among information elements of data included in the beacon signal.

In the step S450, the STA 120-1, 120-2, 120-N utilizes the beacon receiver program 130-1, 130-2, 130-N to perform negative filtering on the result value of the current beacon signal and the result value of the prior beacon signal and remove only unnecessary information elements.

According to an identification result in the step S530, when there is no data changed in the result obtained by performing the negative filtering, the STA 120-1, 120-2, 120-N utilizes the beacon receiver program 130-1, 130-2, 130-N to operate in the sleep mode (S540).

In the step S540, when values obtained by performing the negative filtering on the result value of performing the checksum on the current beacon signal and on the prior beacon signal are the same, the STA 120-1, 120-2, 120-N confirms that the information element does not contain changed data.

According to an identification result in the step S530, when there is data changed in the result obtained by performing the negative filtering, the STA 120-1, 120-2, 120-N utilizes the beacon receiver program 130-1, 130-2, 130-N to update network information (S550).

In the step S550, when values obtained by performing the negative filtering on the result value of performing the checksum on the current beacon signal and on the prior beacon signal are not the same, the STA 120-1, 120-2, 120-N confirms that the information element contains changed data.

In the step S550, the STA 120-1, 120-2, 120-N utilizes the beacon receiver program 130-1, 130-2, 130-N to change part or all of modules of hardware and software necessary for communication with the access point 110 to a wake-up state and process data corresponding to necessary information element of the changed data.

The steps S510 to S550 as shown in FIG. 5 are sequentially performed, but not limited thereto. That is, an order of performing the steps is variable or at least one or more than one of the steps are performed in parallel. Therefore, FIG. 5 is not to limited to a time sequence order.

As described above, the beacon signal minimization method using the frequently changed beacon element according to the second embodiment as shown in FIG. 5 can be implemented by a program and recorded on a non-transistory computer-readable recording medium. A program for implementing the beacon signal minimization method using the frequently changed beacon element according to the second embodiment is recorded in a non-transistory computer-readable recording medium including all kinds of records in which data that can be read by a computer system.

Figure 6:
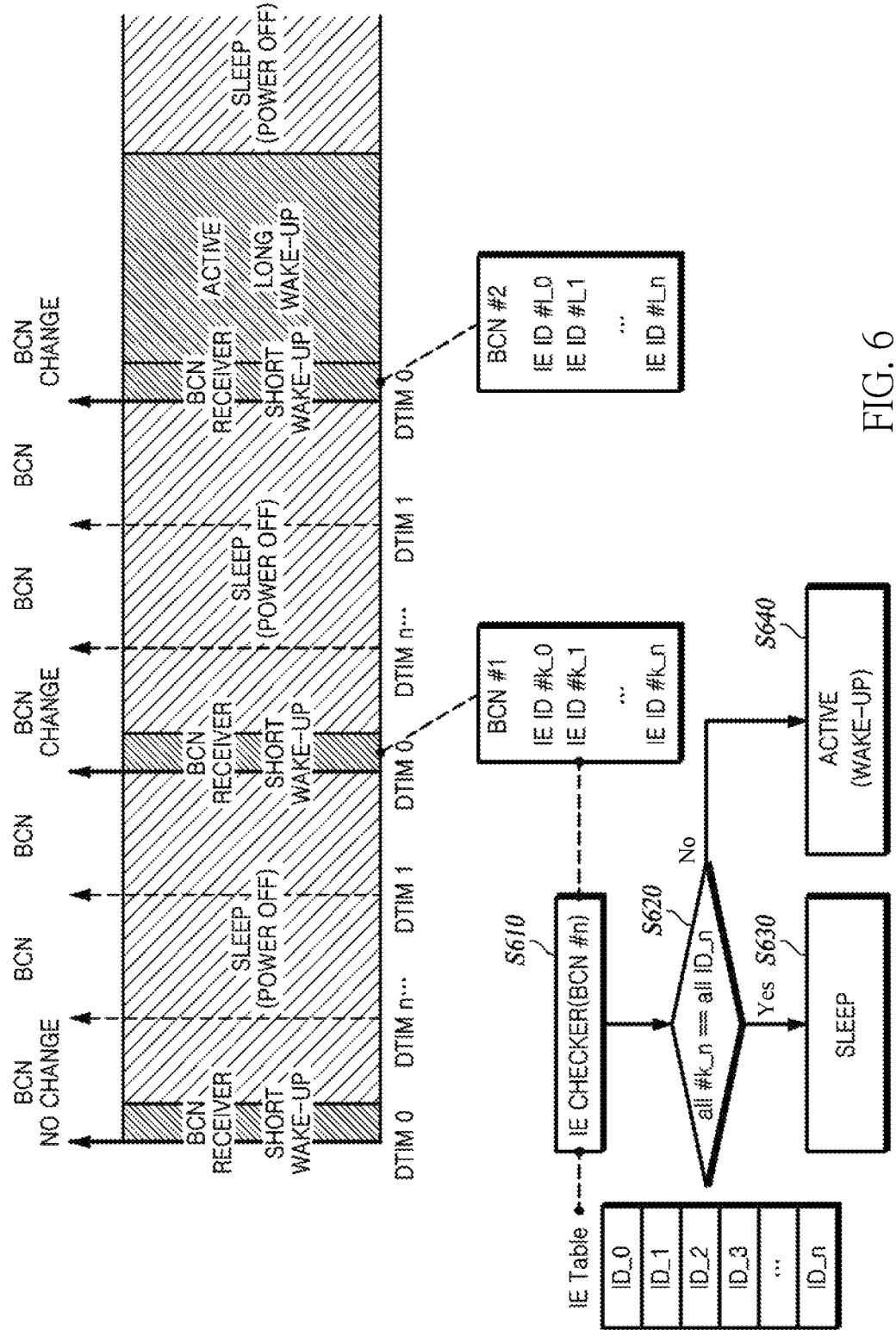
FIG. 6 is a diagram showing a method of processing a beacon signal utilizing a necessary information element of the present embodiment.

FIG. 6 is a diagram showing a method of processing a beacon signal utilizing a necessary information element of the present embodiment.

As shown in FIG. 6, the STA 120-1, 120-2, 120-N utilizes the beacon receiver program 130-1, 130-2, 130-N to check an necessary information element, and identify an information element of the current beacon signal (CHECKER) (S610).

In the step S610, the STA 120-1, 120-2, 120-N utilizes the beacon receiver program 130-1, 130-2, 130-N (IE CHECKER) to check whether the information element of the current beacon signal belongs to the necessary information element for communication with the access point 110.

In order to check unnecessary information elements, the beacon receiver program 130-1, 130-2, 130-N carried by the STA 120-1, 120-2, 120-N stores in advance unnecessary information elements in a table. In other words, the beacon receiver program 130-1, 130-2, 130-N stores in advance necessary information elements for communication with the access point 110, and unnecessary information elements in the table.

The STA 120-1, 120-2, 120-N utilizes the beacon receiver program 130-1, 130-2, 130-N to check whether the current beacon signal received from the access point 110 contains a checksum of data which is same as that of the prior beacon signal. In other words, STA 120-1, 120-2, 120-N utilizes the beacon receiver program 130-1, 130-2, 130-N to check whether the checksum of the current beacon signal is changed by comparing it with the prior beacon signal.

The STA 120-1, 120-2, 120-N utilizes the beacon receiver program 130-1, 130-2, 130-N, based on the result vale of the checksum, to check whether the current beacon signal received from the access point 110 contains data same as that of the prior beacon signal (S620).

In the step S620, the STA 120-1, 120-2, 120-N utilizes the beacon receiver program 130-1, 130-2, 130-N to check whether the current beacon signal contains the data same as that of the prior beacon signal by comparing the result value of performing the checksum on the current beacon signal received from the access point 110 with the result value of performing the checksum on the prior beacon signal.

When the result value of performing the checksum on the current beacon signal received from the access point 110 is same as the result value of performing the checksum on the prior beacon signal, the STA 120-1, 120-2, 120-N confirms that the current beacon signal does not contain changed data, and the STA 120-1, 120-2, 120-N operates in the sleep mode (S630).

When the result value of performing the checksum on the current beacon signal received from the access point 110 is not same as the result value of performing the checksum on the prior beacon signal, the STA 120-1, 120-2, 120-N confirms that the current beacon signal contains changed data, and the STA 120-1, 120-2, 120-N operates in the active mode (S640).

In the step S640, the STA 120-1, 120-2, 120-N utilizes the beacon receiver program 130-1, 130-2, 130-N to change part or all of modules of hardware and software necessary for communication with the access point 110 to a wake-up state and process the changed data of the data contained in the beacon signal.

The steps S610 to S640 as shown in FIG. 6 are sequentially performed, but not limited thereto. That is, an order of performing the steps is variable or at least one or more than one of the steps are performed in parallel. Therefore, FIG. 6 is not to limited to a time sequence order.

As described above, the beacon signal minimization method using the frequently changed beacon element according to the first embodiment as shown in FIG. 6 can be implemented by a program and recorded on a non-transistory computer-readable recording medium. A program for implementing the beacon signal minimization method using the frequently changed beacon element according to the first embodiment is recorded in a non-transistory computer-readable recording medium including all kinds of records in which data that can be read by a computer system.

As shown in FIG. 6, the STA 120-1, 120-2, 120-N periodically receives a beacon signal from the access point 110, and determines whether to enter a wake-up state from a sleep mode according to the received current beacon signal.

The STA 120-1, 120-2, 120-N identifies whether there is changed data in the data contained in the current beacon signal periodically received from the access point 110. The STA 120-1, 120-2, 120-N is changed from the sleep mode to the wake-up state according to whether the changed data exists in the data contained in the current beacon signal.

The STA 120-1, 120-2, 120-N shortly wakes up from the sleep mode to receive a current beacon signal from the access point 110.

The STA 120-1, 120-2, 120-N in a shortly wake-up state receives a beacon signal from the access point 110 and identifies whether the changed data exists in the data contained in the current beacon signal.

When the data of the current beacon signal contains changed data, as shown in FIG. 5, the STA 120-1, 120-2, 120-N shortly wakes up part or all of modules of hardware and software necessary for communication with the access point 110 to process the changed data contained in the data of the current beacon signal.

When the data of the current beacon signal contains changed data, as shown in FIG. 6, the STA 120-1, 120-2, 120-N long wakes up part or all of modules of hardware and software necessary for communication with the access point 110 to process the changed data contained in the data of the current beacon signal.

It is understood that the invention may be embodied in other forms within the scope of the claims. Thus the present examples and embodiments are to be considered in all respects as illustrative, and not restrictive, of the invention defined by the claims.

What is claimed is:

1. A beacon signal processing system comprising a memory, a processor, and an information table unit configured to store a necessary information element for communication with the access point, wherein a beacon receiver program containing computerized instructions is stored in the memory and configured to be executed by the processor to perform a method, the method comprising:
periodically receiving, by a beacon receiver, a beacon signal from an access point;
identifying an information element of data contained in the beacon signal;

generating a result value of performing a checksum on the information element, and identifying whether the information element is changed according to the result value;

enabling a sleep mode of the processor according to whether or not the information element is changed, comparing the necessary information element with the information element, and identifying whether the information element is the necessary information element.

2. The beacon signal processing system of claim 1, wherein when the information element is identified as an unnecessary information element, the processor operates in the sleep mode by turning off part or all of modules of hardware and software necessary for communication with the access point.

3. The beacon signal processing system of claim 2, wherein when the information element is identified as the necessary information element, the beacon receiver program executed by the processor performs the checksum on the information element identified as the necessary information element, generates the result value of the beacon signal defined as a current beacon signal, and identifies whether the information element contains changed data according to the result value of the current beacon signal.

4. The beacon signal processing system of claim 2, wherein the processor performs the checksum on the information element identified as the necessary information element, generates the result value of the beacon signal defined as a current beacon signal, and performs the checksum on the information element contained in a beacon signal which is received by the beacon receiver before the current beacon signal and is defined as a prior beacon signal, and wherein the processor further generates a result value of the prior beacon signal, and compares the result value of the current beacon signal with the result value of the prior beacon signal, and identifies whether the information element contained in the current beacon signal contains changed data.

5. The beacon signal processing system of claim 4, wherein the method further comprises comparing whether the result value of the current beacon signal is same as the result value of the prior beacon signal.

6. The beacon signal processing system of claim 5, wherein when the result value of the current beacon signal is same as the result value of the prior beacon signal, the beacon receiver program executed by the processor confirms that the information element does not contain changed data, and operates in the sleep mode.

7. The beacon signal processing system of claim 5, wherein when the result value of the current beacon signal is not same as the result value of the prior beacon signal, the beacon receiver program executed by the processor confirms that the information element contains changed data, and the processor operates in an active mode.

8. The beacon signal processing system of claim 7, wherein to operate in the active mode, the processor changes part or all of modules of hardware and software necessary for communication with the access point to a wake-up state, and processes the changed data of the information element.

9. A non-transitory computer-readable recording medium, recording a program for performing a method, the method comprising:

periodically receiving a beacon signal from an access point;

identifying an information element of data contained in the beacon signal;

generating a result value of performing a checksum on the information element, and identifying whether the information element is changed according to the result value;

operating in a sleep mode according to whether or not the information element is changed, comparing a necessary information element with the information element, and identifying whether the information element is the necessary information element, wherein the necessary information element is stored in an information table for communications with the access point.

* * * * *